United States Patent [19]

Shimomura

[11] 4,088,394
[45] May 9, 1978

[54] ELECTRO-OPTICAL LIGHT CONTROL ELEMENT

[75] Inventor: Jun Shimomura, Tokyo, Japan

[73] Assignee: Nippon Kogaku K.K., Tokyo, Japan

[21] Appl. No.: 688,740

[22] Filed: May 21, 1976

[30] Foreign Application Priority Data

May 29, 1975 Japan .................................. 50-63438

[51] Int. Cl.² .............................................. G02F 1/28
[52] U.S. Cl. ................................................. 350/356
[58] Field of Search ............. 350/160 R, 160 LC, 150

[56] References Cited

U.S. PATENT DOCUMENTS

| 3,688,166 | 8/1972 | Desvignes | 350/160 R |
| 3,825,777 | 7/1974 | Braun | 307/309 |
| 3,953,108 | 4/1976 | Schmidt et al. | 350/150 |
| 3,954,323 | 5/1976 | Andrews et al. | 350/160 R |

Primary Examiner—William L. Sikes
Assistant Examiner—Marcus S. Rasco

Attorney, Agent, or Firm—Shapiro and Shapiro

[57] ABSTRACT

An electro-optical light control element comprises a pair of transparent electrodes disposed in a predetermined spaced apart relationship, a layer of electro-optical substance disposed between the transparent electrodes and having a light transmission factor variable in accordance with a voltage applied thereto, and a substrate supporting thereon the transparent electrodes and the layer of electro-optical substance. The transparent electrodes and the layer of electro-optical substance together form a control area for controlling the quantity of light passing the transparent electrodes and the layer of electro-optical substance. Conductor electrodes are provided around the control area at a plurality of locations on one of the transparent electrodes and at least one location on the other transparent electrode so that the distribution of the light transmission factor within the control area may be made to substantially conform to a predetermined distribution characteristic.

7 Claims, 6 Drawing Figures

ELECTRO-OPTICAL LIGHT CONTROL ELEMENT

BACKGROUND OF THE INVENTION

1. Field of the Invention

This invention relates to a light control element using an electro-optical substance.

2. Description of the Prior Art

When a light control element using an electro-optical substance, such as a double-refractive crystal, a liquid crystal, a suspension containing dipole molecules having a light absorbing property, a ferroelectric ceramic or an electrochromic layer, is placed in the light path of an optical system, it is generally desired that scattering and/or diffraction and undesirable reflection and/or refraction of light be avoided as far as possible. Thus, in the operative area over which the passage of light is to be controlled, the transparent electrodes, the insulation coating and the layer of electro-optical substance should preferably be formed simply as layered, parallel, thin films, for example supported on a substrate. However, such thin films are not always formed uniformly, because of manufacturing variations. The method of manufacture employed may be any of several, including, for example, evaporation, sputtering, enveloping of liquid, plating and photoetching, and the thin films are only rarely sufficiently free of non-uniformity to be fully utilized in numerous optical applications. This presents a particularly serious problem in instances in which the control area is relatively large, as is the case when the electro-optical light control element is to be utilized in such applications as sun glasses, photographic filters, the picture planes of cameras, or the focal planes of aperture portions of optical systems.

SUMMARY OF THE INVENTION

The present invention provides an electro-optical light control element in which local non-uniformity of the light control element is substantially reduced without impairing the optical performance of the element.

According to the present invention, the electro-optical light control element comprises at least a pair of transparent electrodes disposed in a predetermined spaced apart relationship, and a layer of electro-optical substance disposed between said transparent electrodes and having the light transmission factor thereof variable in accordance with the voltage applied thereto, the transparent electrodes and the layer of electro-optical substance together forming a control area for controlling the quantity of light passing through the transparent electrodes and the layer of electro-optical substance. The transparent electrodes and the layer of electro-optical substance may be supported on a transparent substrate. A feature of the present invention lies in the provision of conductor electrodes around the control area at a plurality of locations on one of the transparent electrodes, and at at least one location on the other transparent electrode, so that the distribution of the light transmission factor in the control area can be made to substantially conform to a predetermined distribution characteristic.

The transparent electrodes may have portions projecting outwardly of the control area for carrying thereon the conductor electrodes. The substrate may comprise a transparent flat plate. If desired, the light control element of the present invention may further comprise a reflecting surface so as to reflect the light entering the control area and passing therethrough. This reflecting surface, for example, may be formed on that side of the substrate on which the transparent electrodes are disposed or alternatively, it may be formed on that side of the substrate on which the transparent electrodes are not disposed.

The control element may further include a layer of insulative material disposed between one or both of the transparent electrodes and the layer of electro-optical substance, for example in the form of a protective film disposed between one or both of the transparent electrodes and the layer of electro-optical substance to prevent electrical and chemical actions from occurring between the transparent electrodes and the layer of electro-optical substance.

The invention will become more fully apparent from the following detailed description thereof, particularly when taken in conjunction with the accompanying drawings.

DESCRIPTION OF THE PREFERRED EMBODIMENTS

Figure 1:
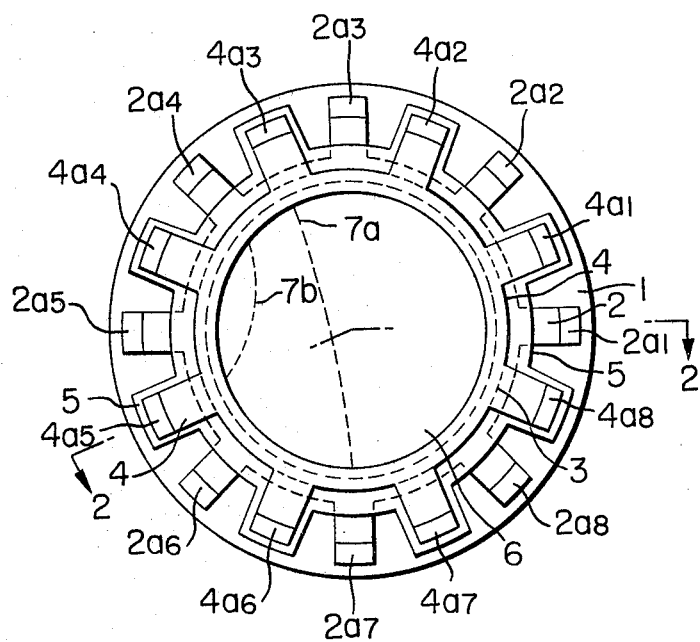
FIG. 1 is a plan view of a light control element according to one embodiment of the present invention.
Figure 2:
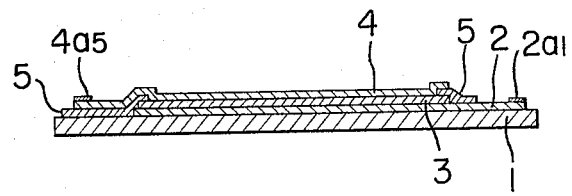
FIG. 2 is a cross-sectional view taken along the line 2—2 in FIG. 1.

Referring to FIGS. 1 and 2, a substrate 1, which, for example, may be formed of glass or like material and which may be flat, carries thereon a first transparent electrode 2 formed, for example, of Nesa film, indium oxide film or the like. The first transparent electrode 2 is formed with a plurality of protrusions, and these individual protrusions have connected thereto conductor electrodes $2a_1, 2a_2, \ldots, 2a_8$, respectively. Overlaid on the first transparent electrode 2 is a layer 3 of electro-optical substance, over which is provided a second transparent electrode 4, which can be of a material similar to that of the first transparent electrode 2. The second transparent electrode 4 is formed with a plurality of protrusions similar to those of the first transparent electrode (the respective protrusions being interlaced as shown), and conductor electrodes $4a_1, 4a_2, \ldots, 4a_8$ are connected to these protrusions, respectively. Interposed between the layer 3 of electro-optical substance and the second transparent electrode 4 is a doughnut-shaped insulating layer 5 of insulative material so as to isolate the second transparent electrode 4 from the substrate 1 and from the first transparent electrode 2. The portion in which the layers 1, 2, 3 and 4 simply overlap one another, namely, the portion inside the smallest circle in FIG. 1, forms a control area 6, and preferably the layers 1, 2, 3, and 4 are in parallelism within control area 6.

The light control element described above is placed in the light path of an optical system, and a voltage is applied between the two transparent electrodes 2 and 4 to control the quantity of light which can pass through the control area 6. However, as noted above, it cannot be expected that a uniform electric field is applied to the entire surface of the control area 6. Although the transparent electrodes 2 and 4 are of relatively small resistance, they do have a substantially fixed volume resistivity, and, therefore, at locations remote from the points at which the voltage is applied, the electric field applied to the layer 3 of electro-optical substance is weaker due to the voltage drop in the conductor electrodes. Thus, for example, if the voltage is applied by means of the conductor electrodes 2a and 4a, then in the neighborhood of the conductor electrodes 2a and 4a the electric field applied to the layer 3 is stronger than in locations remote from conductor electrodes 2a and 4a.

In an ideal case the substances forming the light control element, including the transparent electrodes 2 and 4 and the layer 3 of electro-optical substance, are each of a uniform (equal) thickness. Assuming that an electric field is applied between the two transparent electrodes 2 and 4 from an external voltage source (not shown) by coupling the voltage across the conductor electrodes $2a_7$ and $4a_3$, a locally stronger electric field will be produced in the cross-section of the layer 3 of the electro-optical substance indicated in FIG. 1 by broken line 7a than in other portions of the control area 6. Likewise, if the voltage is applied across the conductor electrodes $2a_4$ and $4a_5$, the maximum electric field will be produced in the cross-section of the layer 3 along broken line 7b.

In practice, as already noted, various irregularities are present throughout the entire control area 6 so that the distribution of the electric field intensity actually differs from that in the ideal case. More specifically, the distribution of the electric field intensity actually provided is due to a combination of the influence of local irregularities resulting during manufacture, the influence resulting from the particular conductor electrodes 2a and 4a which are selected, and the magnitude of the voltage applied to the selected conductor electrodes.

Thus, according to the present invention, one or more of the plurality of conductor electrodes 2a and one or more of the plurality of conductor electrodes 4a are suitably selected, and a voltage is applied to the selected electrodes, with the result that the local distribution of the light transmission or reflection characteristics within the control area 6 substantially conforms to a desired predetermined distribution characteristic. If a uniform light distribution characteristic is desired throughout the entire control area 6, this may be achieved by experimentally or otherwise selecting suitable conductor electrodes 2a and 4a which provide a field distribution that cancels any non-uniformity of the control layers resulting from the manufacture, and by applying an appropriate magnitude of voltage to the selected electrodes.

If optically required, a control characteristic resulting in a light distribution characteristic differing from the central portion of the control area to the marginal portion of the control area may be provided after the local irregularities resulting from the manufacture are negated.

Figure 3:
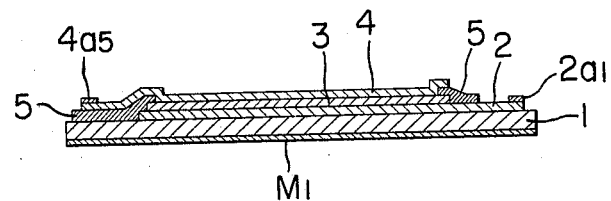
FIGS. 3, 4, 5, and 6 are cross-sectional views similar to FIG. 2 but illustrating further embodiments of the present invention.
Figure 4:
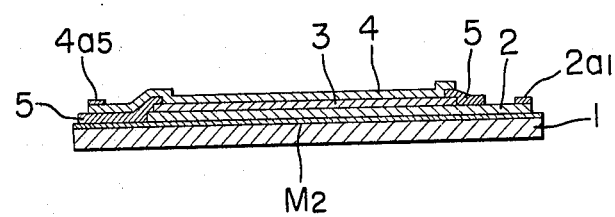

The light control element can control not only transmitted light, but also reflected light if the element includes therein a reflecting surface, as shown in FIGS. 3 and 4. For example, if the light control element has a reflecting surface formed on the lower surface M1 in FIG. 3 or on the upper surface M2 in FIG. 4 of the substrate 1 in the control area 6, the reflected light is also controlled.

Figure 5:
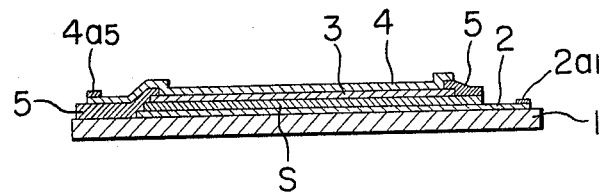

Additionally, as proposed in U.S. Pat. No. 3,521,941 which discloses an element using a liquid crystal or an electro-chromic layer in the control area, there may be provided a further improved element by interposing between the layer 3 of the electro-optical substance and the transparent electrode 2, a uniform thin film S, depicted in FIG. 5, having a special function like a layer of insulative material formed of a current carrier permeable insulator.

Figure 6:
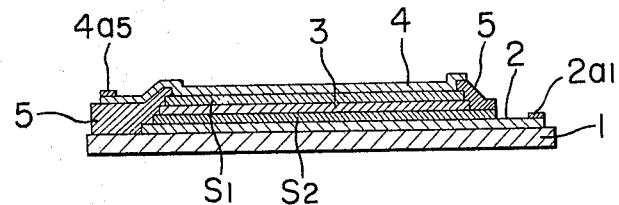

Further, as proposed in U.S. Pat. No. 3,824,002, protective films S1 and S2, formed of insulative material can be provided on the opposite sides of the electro-optical substance, in the manner shown in FIG. 6, to prevent electrical and chemical actions from occurring between the transparent electrodes and the electro-optical substance.

According to the present invention, as described above, local non-uniformity or irregularity of the light control function, which has heretofore unavoidably resulted from irregularities occurring during manufacture, can be corrected to provide a light distribution characteristic as predetermined through calculation.

Thus, the present invention provides an excellent and practical light control element even in those cases where the problem of local non-uniformity otherwise occurs, as when light control elements formed of an electro-optical substance are utilized for sun glasses, photographic filters, aperture surfaces or lens stop surfaces of cameras. In addition, the transparent electrodes 2 and 4, electro-optical substance layer 3 and associated layers need not be formed in any fine, specific pattern, and so the end edges of these control layers need not come into the control area 6; thus the possibility of impaired optical performance, such as increased aberrations resulting from scattering or diffraction of light, which has heretofore been liable to occur due to the particular pattern lying in the light path, is eliminated.

I claim:

1. In an electro-optical light control element including at least a pair of transparent electrodes disposed in a predetermined spaced apart relationship, a layer of electro-optical substance disposed between said transparent electrodes and having the light transmission factor thereof variable in accordance with a voltage applied thereto, and substrate means supporting thereon said transparent electrodes and said layer of electro-optical substance, said transparent electrodes and said layer of electro-optical substance together forming a control area for controlling the quantity of light passing through said transparent electrodes and said layer of electro-optical substance, the improvement comprising:

separate conductor electrodes positioned around said control area at a plurality of locations on one of said transparent electrodes and at at least one location on the other of said transparent electrodes so that the distribution of the light transmission factor within said control area may be made to substantially conform to a predetermined distribution characteristic by applying a voltage between a conductor electrode at at least one location on one transparent electrode and a conductor electrode at at least one location on the other transparent electrode.

2. In an element according to claim 1, the improvement wherein said transparent electrodes have portions projecting outwardly of said control area, and said conductor electrodes are positioned on said portions.

3. In an element according to claim 2, the improvement wherein projecting portions of one transparent electrode are positioned between projecting portions of the other transparent electrode so that the projecting portions of one transparent electrode are interlaced with the projecting portions of the other transparent electrode.

4. An element according to claim 1, wherein said substrate means, said electrodes and said layer are flat and parallel.

5. An element according to claim 1, further comprising a reflecting surface formed on one side of said substrate means so as to reflect light entering said control area and passing therethrough.

6. An element according to claim 1, wherein a layer of insulative material is disposed between at least one of said transparent electrodes and said layer of electro-optical substance.

7. An element according to claim 1, wherein a first protective film is disposed between at least one of said transparent electrodes and said layer of electro-optical substance to prevent electrical and chemical actions from occurring between said one of said transparent electrodes and said layer of electro-optical substance.

* * * * *